United States Patent [19]

Nishimura

[11] Patent Number: 5,491,696
[45] Date of Patent: Feb. 13, 1996

[54] SYNCHRONOUS/ASYNCHRONOUS SYSTEM HAVING FUNCTION OF SWITCHING PATH UPON FAULT

[75] Inventor: Koichi Nishimura, Kawasaki, Japan

[73] Assignee: Fujitsu Limited, Kanagawa, Japan

[21] Appl. No.: 282,797

[22] Filed: Jul. 29, 1994

[30] Foreign Application Priority Data

Nov. 8, 1993 [JP] Japan .................................... 5-278414

[51] Int. Cl.⁶ .................................................. H04J 3/14
[52] U.S. Cl. ........................... 370/16.1; 370/14; 371/20.6
[58] Field of Search .................. 370/16.14, 16.1, 370/60, 110.1, 85.12, 85.15, 91, 92, 93, 94.1, 94.2; 371/20.5, 20.6, 16.5, 15.1, 7, 8.1, 8.2, 11.1, 11.2, 11.3

[56] References Cited

U.S. PATENT DOCUMENTS

| | | | |
|---|---|---|---|
| 4,506,357 | 3/1985 | Nakayashiki et al. | 370/16 |
| 4,835,763 | 5/1989 | Lau | 360/16 |
| 5,159,595 | 10/1992 | Flanagan et al. | 370/85.15 |
| 5,265,096 | 11/1993 | Parruck | 370/110.1 |
| 5,278,824 | 1/1994 | Kremer | 370/16.1 |
| 5,282,200 | 1/1994 | Dempsey et al. | 370/85.12 |
| 5,307,343 | 4/1994 | Bostica et al. | 370/60 |

Primary Examiner—Melvin Marcelo
Assistant Examiner—Huy D. Vu

[57] ABSTRACT

A composite asynchronous/synchronous system switches signal paths at the time of a fault and uses a route diversity function even when a fault occurs in the asynchronous mode signal. The composite system includes asynchronous system fault notifying circuit in each of the connection offices connecting the synchronous communication system and the asynchronous communication system. When an asynchronous system alarm indication signal AIS shows suspension of the asynchronous mode signal or a fault in the signal, the notifying circuit converts a fault detection signal to information recognizable in the synchronous mode and sends the information to an asynchronous system fault path switching circuit which is provided in the path termination office. The switching circuit detects the fault detection signal generated in the asynchronous mode, or receives the fault detection signal sent from the asynchronous system fault notifying circuit, and switches paths formed on ring-like transmission lines.

14 Claims, 15 Drawing Sheets

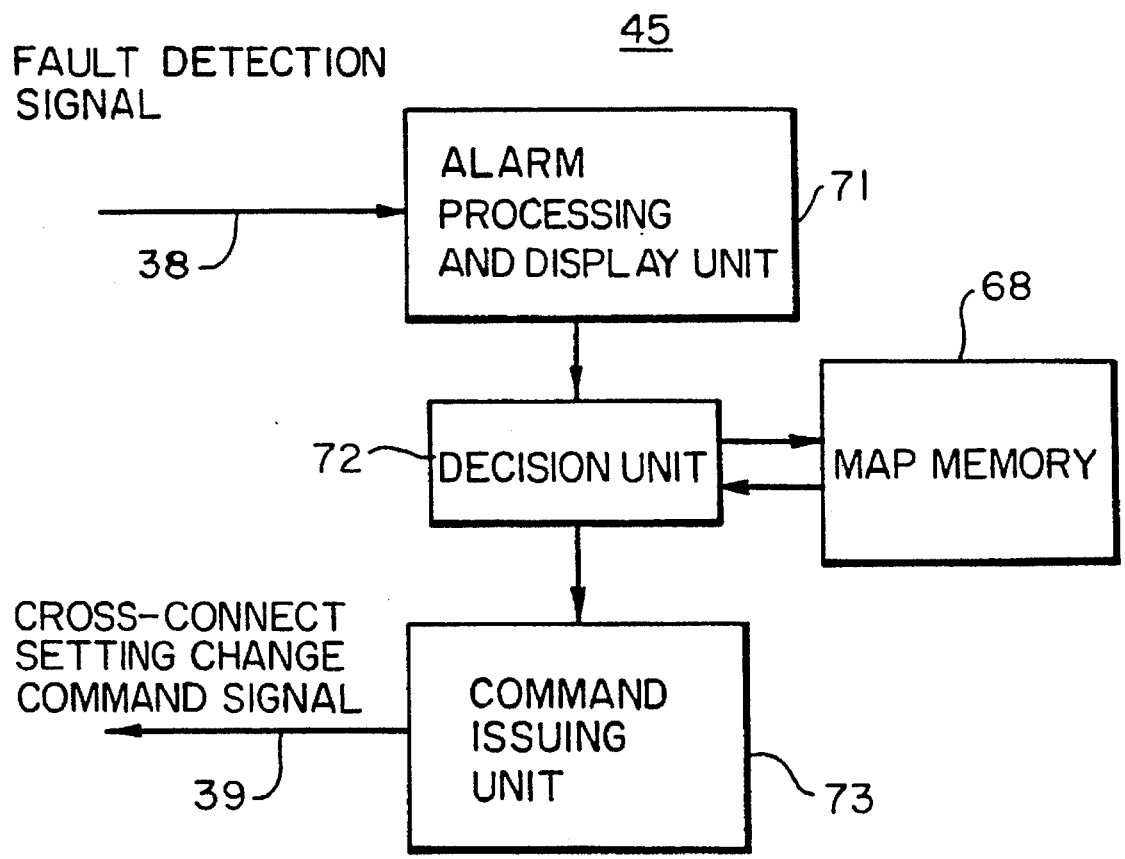
F I G. 12

5,491,696

1

SYNCHRONOUS/ASYNCHRONOUS SYSTEM HAVING FUNCTION OF SWITCHING PATH UPON FAULT

BACKGROUND OF THE INVENTION

The present invention relates to path switching at the time of a fault in a composite synchronous/asynchronous system comprised of a combination of a synchronous communication system and an asynchronous communication system.

Until now, communication networks have been constructed based on an asynchronous communication system (stuff multiplexing), but in recent years a synchronous communication system (synchronous multiplexing), different from the above-mentioned asynchronous communication systems, has been proposed for the purpose of globally standardizing the hierarchies in different countries. This new system is called the SDH (synchronous digital hierarchy) in Europe and Japan and is called SONET (synchronous optical network) in North America.

Therefore, future communication networks will probably be constructed by a composite synchronous/asynchronous system incorporating a synchronous communication system in an asynchronous communication system. The present invention refers to a responsive measure at the time of a fault in such a composite asynchronous/synchronous system.

FIG. 13 is a view showing an example of the general configuration of a synchronous communication system. In the figure, 10 shows the synchronous communication system as a whole. As illustrated, the synchronous communication system 10 adopts a so-called "ring structure" comprised of ring-like transmission lines 11 and 12 forming a closed loop. These ring-like transmission lines 11 and 12 have a plurality of offices 13A to 13D inserted in them (however, only four offices are shown here for simplification). These offices are called network nodes. A "through", "drop", or "insert" operation is performed for the path signal at each office (13). A "through" operation means the path signal running on the ring-like transmission line 11 passes through the office, a "drop" operation means that the signal destined for a home office is pulled in out of the path signal running on the ring-like transmission lies 11 and 12, and an "insert" operation means that a path signal from a home office is sent out to the ring-like transmission line 11. Note that there are a plurality of paths forming the transmission path of the path signal formed in the transmission line, the above-mentioned drop and insert operations are performed in units of paths, and the above-mentioned closed loop is formed for each path.

Referring to the figure, as one of the intrinsic features of a synchronous communication system, mention may be made of the route diversity. That is, in the figure, if a fault (shown by the x mark in the figure) occurs in the ring-like transmission line 12 at the bottom or at the office 13D inserted in part of the same, thanks to the above-mentioned route diversity function, the path signal running on the top ring-like transmission line 11 in the figure is selected from among the duplexed path signals at the office 13B acting as the path termination office in the case and therefore the path signal is rescued from the fault. This selection is performed by the path switch 17 in the office 13B.

If the above-mentioned synchronous communication system 10 is incorporated into a conventional asynchronous communication system 19, the former system 10 receives a signal of the asynchronous mode (asynchronous hierarchy

2 signal) from the latter system 19 and the signal is transmitted from a connection office between the two systems, e.g., the office 13A, to a path termination office, e.g., the office 13B. The asynchronous mode signal is shown by Sa in the figure. It is converted to a synchronous mode path signal (synchronous hierarchy signal) Ss by the asynchronous/synchronous converter 14 in the office 13A, then is duplexed into two routes by a path branch unit 15 and sent out to the ring-like transmission lines 11 and 12.

The path termination office 13B receives at the path switch 17 a signal Ss from the ring-like transmission line 11 through the path monitors 16 corresponding to the two routes. The path switch 17 selects one of the routes. If a path monitor 16 detects some sort of fault in the selected path signal, the path switch 17 changes over to the other route. Note that the path monitor 16 is activated when an AIS (alarm indication signal) showing the suspension of the path signal or a fault in the path signal is detected and switches the path switch 17.

The synchronous mode path signal Ss passing through the path switch 17 is returned to the asynchronous mode signal Sa by the synchronous/asynchronous converter 18 and sent to the communication network constructed under the asynchronous communication system.

FIG. 14 is a view showing a conventional example in which synchronous and asynchronous communication systems are merged. In the synchronous communication system 10 in the composite asynchronous/synchronous system, provision is made of a route diversity function as mentioned above (ring-like transmission lines 11 and 12). Further, the asynchronous communication system 19 is also provided with a similar route diversity function by the redundancy lines (pair of optical fibers) 20. Note that 21 is a redundancy line forming unit and that 22 is a redundancy line termination unit. Part of the redundancy lien termination unit forms part of the above-mentioned connection office 13A.

As clear from FIG. 14, both of the synchronous communication system 10 and the asynchronous communication system 19 can individually enjoy the merits of the route diversity function. However, there is the disadvantage that no protection route can be secured against a fault (shown by the x mark in the figure) occurring in the connection office 13A at a connecting point between these systems 10 and 19. Accordingly, a composite asynchronous/synchronous system which features an improvement on this point has been required.

FIG. 15 is a view of a composite asynchronous/synchronous system improved over the system shown in FIG. 14. According to the configuration in FIG. 15, the connection office 13A shown in FIG. 14 is duplexed so that the connection office 13A and another connection office 13A' are mounted, the connection office 13A is connected to the redundancy line 20a and the connection office 13A' is connected to the redundancy line 20b, and therefore route diversity is formed at the merged portion of the synchronous communication system 10 and the asynchronous communication system 19.

However, there is a problem with the system shown in FIG. 15. By adopting the configuration shown in FIG. 15, route diversity can be formed spanning the synchronous communication system 10 and the asynchronous communication system 19. Under such a configured composite system, if a fault were to occur on the ring-like transmission line 11 (or 12) in the synchronous communication system 10, then as mentioned earlier the fault would be detected by the path monitor 16 and the path monitor 16 would switch the path switch 17 to the ring-like transmission line 12 (or 11) to rescue the system 10 from the fault.

Even if a fault occurred on the redundancy line 20a (or 20b) in the asynchronous communication system 19, however, the path switch 17 would not switch to the ring-like transmission line 12 (or 11). Accordingly, when a fault occurs in the asynchronous communication system 19, the route diversity function of the composite asynchronous/synchronous system will not work. That is, a protection route cannot be ensured and this is the problem in the system shown in FIG. 15.

This type of problem occurs because the fault occurring at the asynchronous communication system 19 side is not detectable at the synchronous communication system 10 side.

SUMMARY OF THE INVENTION

Accordingly, the object of the present invention is to provide a composite asynchronous/synchronous system which can ensure a protection route in the same way as when a fault occurs in a synchronous mode path signal, even when a fault occurs in an asynchronous mode signal.

FIG. 1 is a view showing the basic configuration of the present invention. Note that similar constituent elements are given the same reference numerals or symbols throughout the drawings.

The composite asynchronous/synchronous system to which the present invention is applied, as illustrated, is comprised of a synchronous communication system 10 which has a path termination office 13B inserted into the ring-like transmission lines 11 and 12 and includes a path switch 17 for changing the synchronous mode path signal input from one of the ring-like transmission lines 11 and 12 to the synchronous mode path signal input from the other line when the path termination office 13B detects a synchronous path AIS showing that the synchronous mode path SS has been suspended or there is a fault in the path signal. The composite system also comprises an asynchronous communication system 19 which transmits the asynchronous mode signal Sa and is combined with the synchronous communication system 10. Such a composite asynchronous/synchronous system is improved by at least one of an asynchronous system fault notifying means 31 and asynchronous system fault path switching means 32. Note that in FIG. 1, for convenience, both the means 31 and the means 32 are drawn.

Two asynchronous system fault notifying means 31 are provided: one in each of the two connection offices 13A and 13A' connecting the synchronous communication system 10 and the asynchronous communication system 19 by two routes. When an asynchronous system AIS occurs showing that the asynchronous mode signal Sa has been suspended or there is a fault in the signal, the fault detection signal is converted to information recognizable in the synchronous mode and sent to the path termination office 13B.

The asynchronous system fault path switching means 32 is provided in the path termination office 13B, receives the fault detection signal from the asynchronous system fault notifying means 31, and switches the paths formed on the ring-like transmission lines 11 and 12.

When no asynchronous system fault notifying means 31 is provided, the asynchronous system fault path switching means 32 switches the paths formed on the ring-like transmission lines 11 and 12 when detecting a suspension of the asynchronous system AIS or asynchronous mode signal.

Fault information on the asynchronous mode signal, which cannot be recognized in the synchronous communication system 10, is converted to information recognizable in the synchronous communication system 10 and then sent out to the synchronous communication system so as to urge the synchronous communication system to switch the paths. Alternatively, the paths are switched when the path termination office 13B detects suspension of the asynchronous system AIS or asynchronous mode signal (in this case, there is no asynchronous system fault notifying means 31).

BRIEF DESCRIPTION OF THE DRAWINGS

FIG. 12 is a view showing a preferable means used in the eighth embodiment;

DESCRIPTION OF PREFERRED EMBODIMENTS

Figure 1:
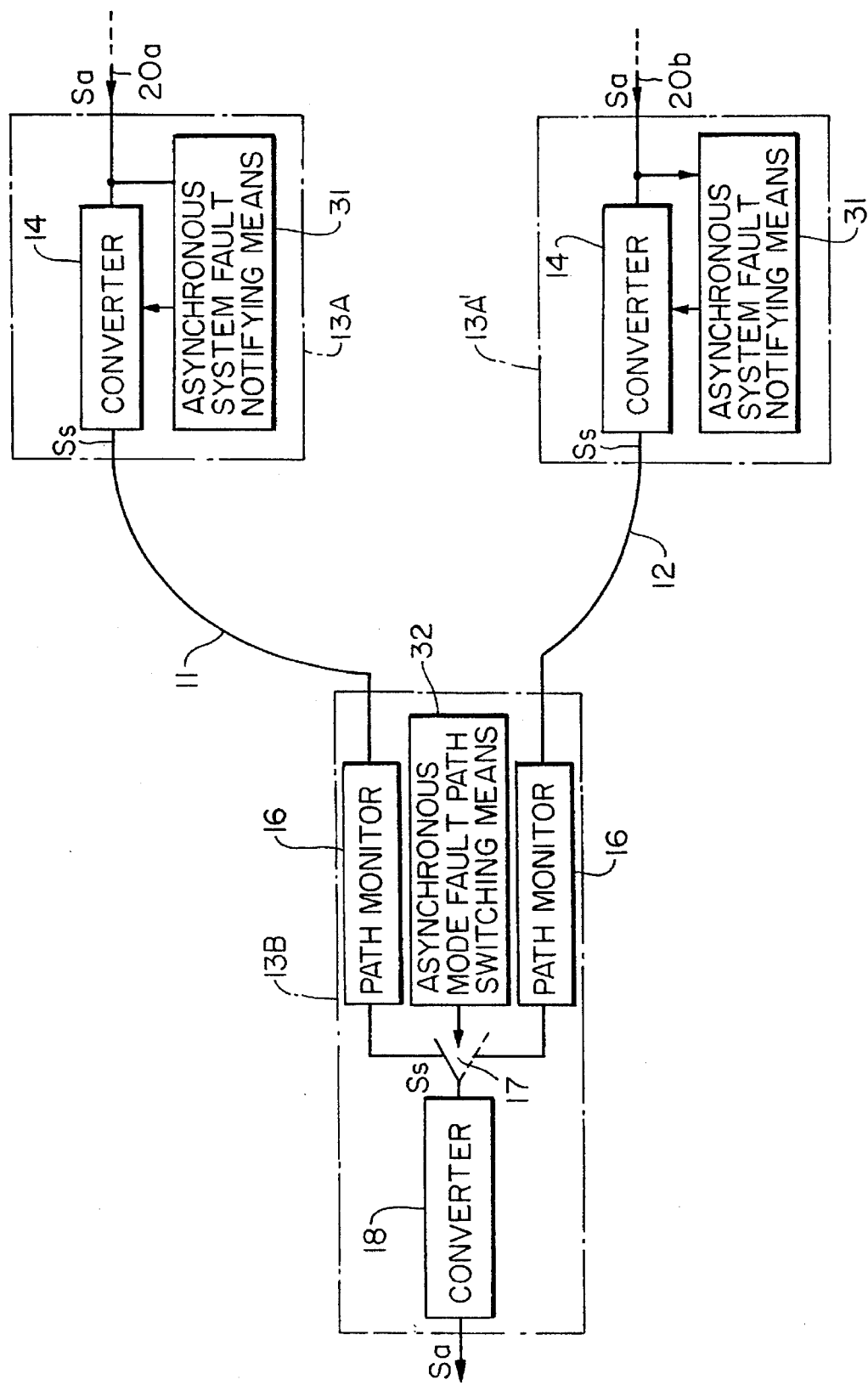
FIG. 1 is a view showing the basic configuration of the present invention.
Figure 2:
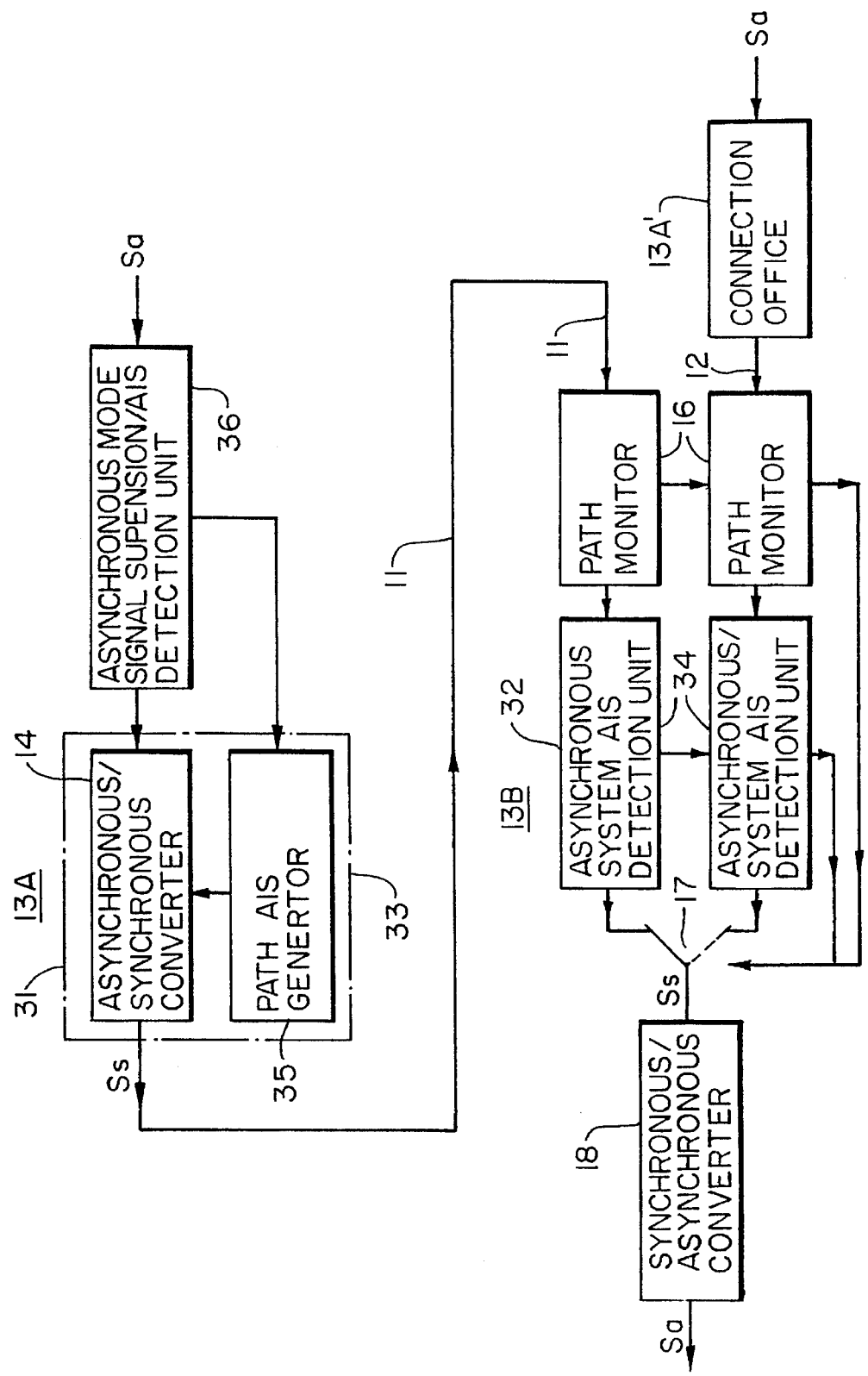
FIG. 2 is a view for explaining the specific configurations of first and second embodiments of the present invention.

FIG. 2 is a view showing a specific configuration of the first and second embodiments of the present invention. Note that among the two connection offices 13A and 13A' in FIG. 1, only the former office 13A is shown in detail at the top of the figure. The office 13A', which is similarly configured, is shown simply by a block. Further, the bottom of the figure shows the path termination office 13B. These offices are connected by the ring-like transmission lines 11 and 12.

Note that the present invention, as mentioned earlier, can be realized by one or more of the asynchronous system fault notifying means 31 and asynchronous system fault path switching means 32, but in FIG. 2, for convenience, both the means 31 and 32 are drawn.

The first embodiment in FIG. 2 is the case where the paths are switched just by the asynchronous system fault notifying means 31, i.e., without requiring the asynchronous system fault path switching means 32. The asynchronous system fault notifying means 31 converts the fault detection signal in the case of detection of a fault such as suspension of the asynchronous system AIS or asynchronous mode signal, into a signal mode of the synchronous path AIS to form the synchronous path AIS and sends this synchronous path AIS to the above-mentioned path termination office 13B. More specifically, it is comprised of a path AIS conversion unit 33.

The above-mentioned fault detection signal for first activating the asynchronous system fault notifying means 31 is output by the previously mentioned asynchronous mode signal suspension/AIS detector 36 which detects the suspension of the asynchronous mode signal Sa or the asynchronous system AIS.

Therefore, in the first embodiment in FIG. 2, by provision of the asynchronous system fault notifying means 31, the previously mentioned path monitor 16 in the path termination office 13B becomes able to catch the fault detection signal of the asynchronous mode signal Sa and can switch the path signal 17.

In the first embodiment described above in more detail, the path AIS conversion units 33 in the connection offices 13A and 13A' are comprised of asynchronous/synchronous converters 14 which convert the asynchronous mode signals to synchronous mode path signals for driving the existing path AIS generators 35 when receiving the above-mentioned fault detection signals showing suspension of the asynchronous mode signal Sa or a fault in the signal, and transferring the thus produced path AIS to the synchronous mode path signal.

That is, the asynchronous/synchronous converter 14 in the connection office 13A (13A') produces and outputs the usual frame comprised of the usual data format at the time of normal communication and produces and outputs an AIS frame comprised of a particular data format at the time of an abnormality. Taking note of this function, when a suspension of the asynchronous mode signal or an asynchronous system AIS is detected by the detector 36, the path AIS generator 35 is activated triggered by this detection and the AIS frame allotted to the synchronous system is produced and output by both the generator 35 and the converter 14.

The second embodiment in FIG. 2 is the case where the paths are switched only by the asynchronous system fault path switching means 32, i.e., without requiring the asynchronous system fault notifying means 31. The asynchronous system fault path switching means 32 views the asynchronous mode signal Sa mapped in the asynchronous mode path signal Ss in the path termination office 13B and switches the path switch 17 when detecting an synchronous system AIS. This synchronous system fault path switching means 32 is shown specifically in the figure as the asynchronous AIS detection unit 34.

The path switch 17 performs the path switching operation not only just by the output of the asynchronous AIS detection unit 34 mentioned above, but also by the output of the path monitor 16 as in the past.

Therefore, in the second embodiment of FIG. 2, by provision of the asynchronous system fault path switching means 32, the existing path switch 17 in the path termination office 13B operates even when a fault occurs in the asynchronous system.

The third embodiment of the present invention provides both of the asynchronous system fault notifying means 31 and the asynchronous system fault path switching means 32 as a pair and the operation of these in concert to switch the paths. Next, this third embodiment will be explained with reference to FIG. 3.

Figure 3:
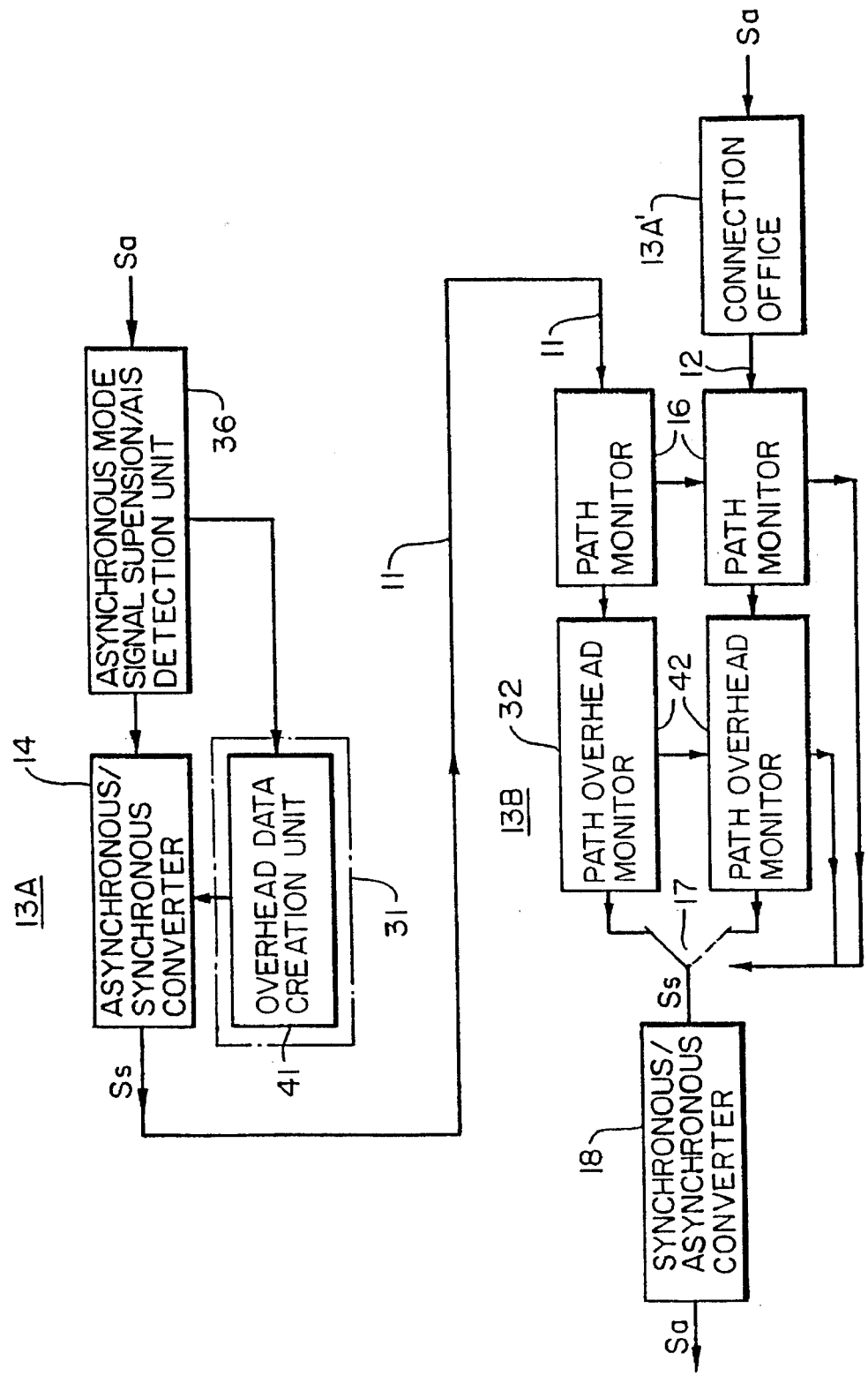
FIG. 3 is a view for showing the specific configuration of a third embodiment of the present invention.

In FIG. 3, the above-mentioned asynchronous system fault notifying means 31 is comprised of an overhead data creation unit 41 which creates the fault detection signal from the asynchronous signal suspension/AIS detector 36 as path overhead (POH) data. In the existing asynchronous/synchronous converter 14 which converts the asynchronous mode signal Sa to the synchronous mode path signal Ss, this created path overhead data is sent, inserted in the synchronous mode path signal Ss.

In the third embodiment, the above-mentioned asynchronous system fault path switching means 32 in the path termination office 13B, which forms part of the pair with the above-mentioned asynchronous system fault notifying means 31, includes the existing path overhead monitor 42 reading the above-mentioned path overhead data.

That is, in the third embodiment, note is taken of the fact that in general signals are provided with path overheads and the synchronous mode fault information is placed in the path overhead. The fault information can be detected by a path overhead monitor 42 inherently provided in the receiving office. More specifically, "0" is written at a specific empty bit (1 bit is enough) in the plurality of path overhead bytes when the situation is normal, and "1" is written when a fault has occurred in the asynchronous system.

Figure 4:
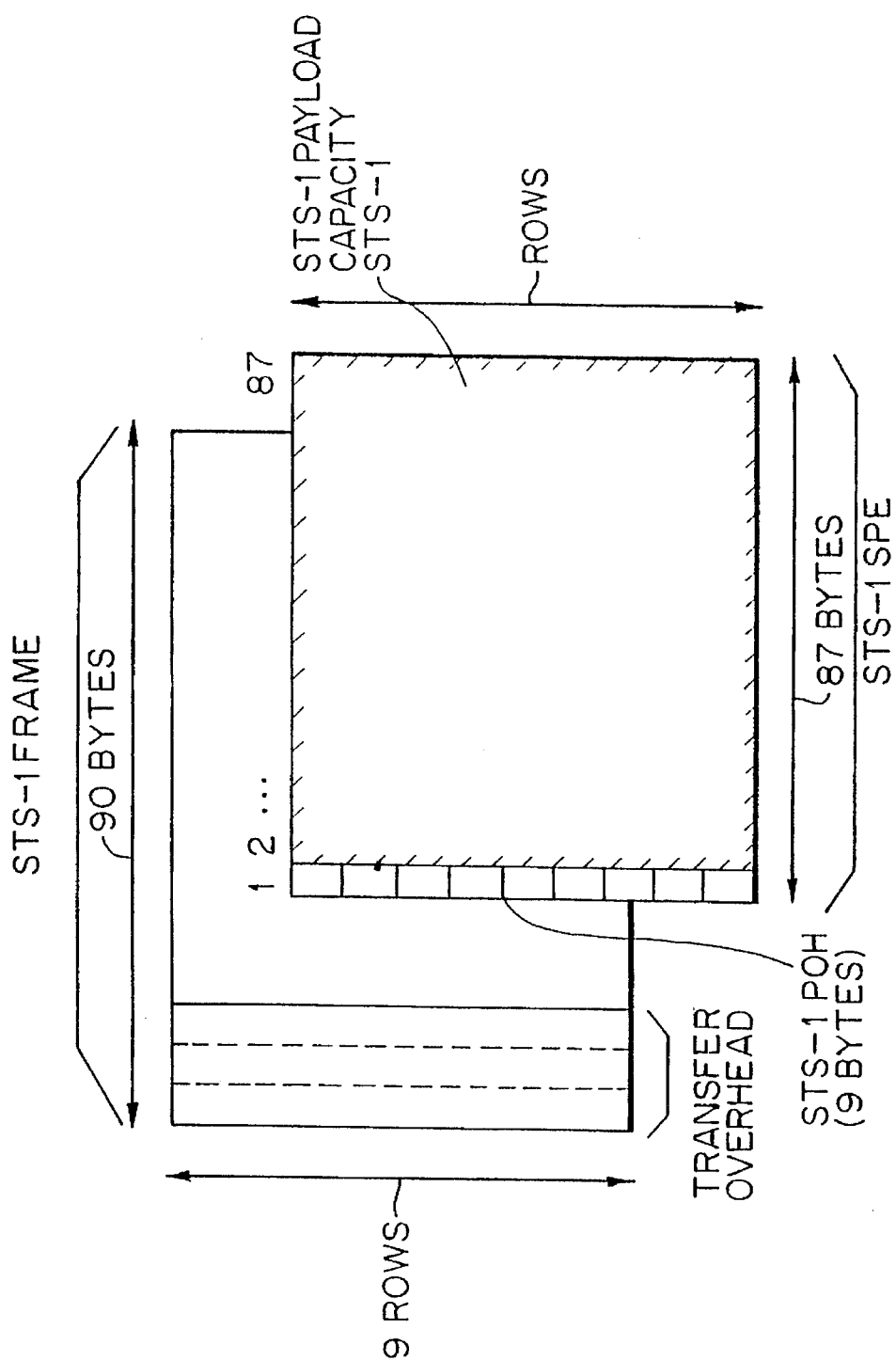
FIG. 4 is a view for showing an example of the known configuration of a path signal.

FIG. 4 is a view showing an example of the known configuration of a path signal. This is prescribed in the previously mentioned SONET. In the figure, the asynchronous mode signal Sa is written as data in the portion marked as the STS-1 payload capacity. The above-mentioned asynchronous mode fault information is written in the part of the STS-1 POH shown at the left side. Note that in the figure, the SPE shown at the bottom is an abbreviation for a synchronous payload envelope.

Figure 5:
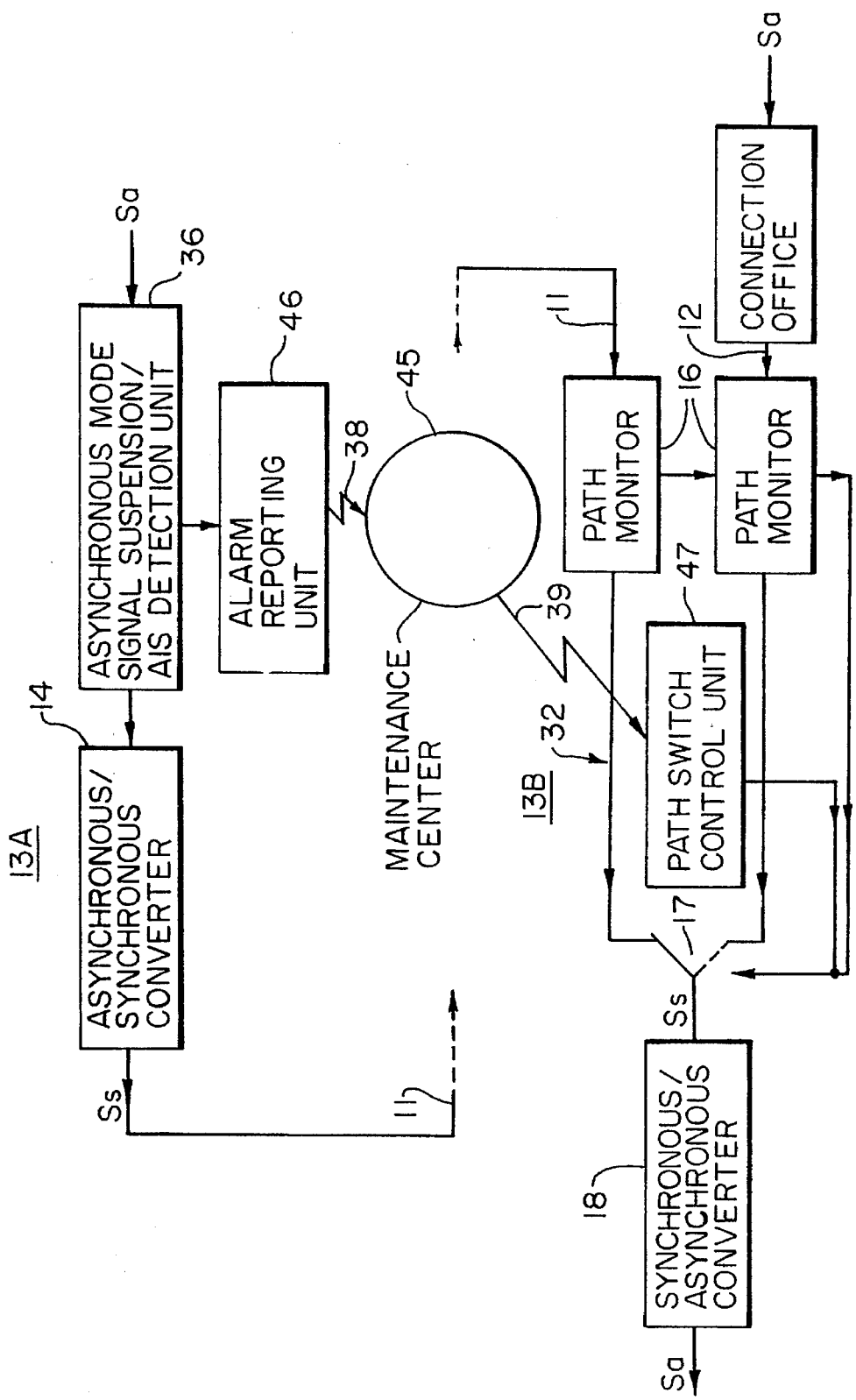
FIG. 5 is a view showing a fourth embodiment of the present invention.

FIG. 5 is a view showing a fourth embodiment of the present invention. In this fourth embodiment, the above-mentioned asynchronous system fault notifying means 31 is comprised of an alarm reporting unit 46 for sending the above-mentioned fault detection signal from the asynchronous signal suspension/AIS detector 35 to an existing maintenance center 45 which centrally monitors and controls the overall composite asynchronous/synchronous system.

Further, the above-mentioned asynchronous system fault path switching means 32 in the path termination office 13B includes a path switch control unit 47 which performs the switching of the path switch 17 in response to a path changeover command transferred from the maintenance center 45.

That is, the fourth embodiment takes note of the fact that there is a maintenance center 45 which centrally monitors and controls both the synchronous communication system 10 and the asynchronous communication system 19, and uses the maintenance center 45 as an interface for linking up the synchronous system and asynchronous system. This linkage is performed through other communication lines 38 and 39.

Figure 6:
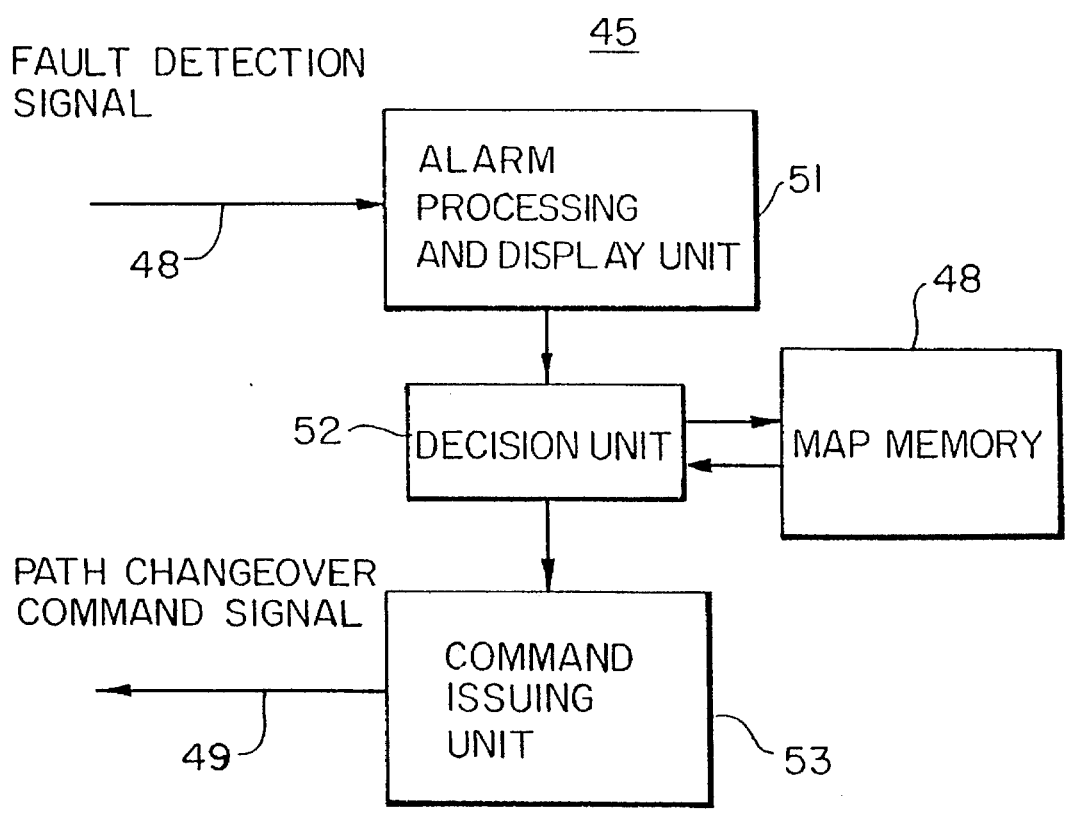
FIG. 6 is a view showing a preferable means used in the fourth embodiment.

FIG. 6 is a view showing a preferable means used in the fourth embodiment. The configuration of the figure is preferably introduced into the maintenance center 45 of FIG. 5 and in particular is characterized by a map memory 48.

That is, the maintenance center 45 is provided with the map memory 48 which holds in the form of a table, information included in the fault detection signal from the alarm reporting unit 46, as pairs of first information showing the originating office of the path of the fault and the channel number of the fault and second information showing the path termination office and channel number relating to the originating office of the path of the fault and the channel number of the fault. The path changeover command mentioned earlier is read out from that map memory 48.

More particularly, there is an existing alarm processing/display unit 51 which receives the fault detection signal, processes it, and displays it on the display (not shown) in the maintenance center 45. A decision unit 52 extracts the content of the detected fault from that unit 51 and determines what number channel of what office should be switched by referring to the map memory 48. It then sends details of its decision to the related office as a path changeover command signal from a command issuing unit 53.

Not all the offices will be offices giving notification of a fault in the asynchronous system and switching paths. Further, the number of offices giving notification of a fault in the asynchronous system (offices A) and the offices having paths which should be switched to deal with the faulty paths of the offices (offices B) is not so large in practice. In addition, there is a predetermined correspondence between the CH-Nos. (channel numbers) of the offices A and the CH-Nos. of the offices B. Therefore, this correspondence is stored in the form of a table in the map memory 48 to enable fast path switching.

Figure 7:
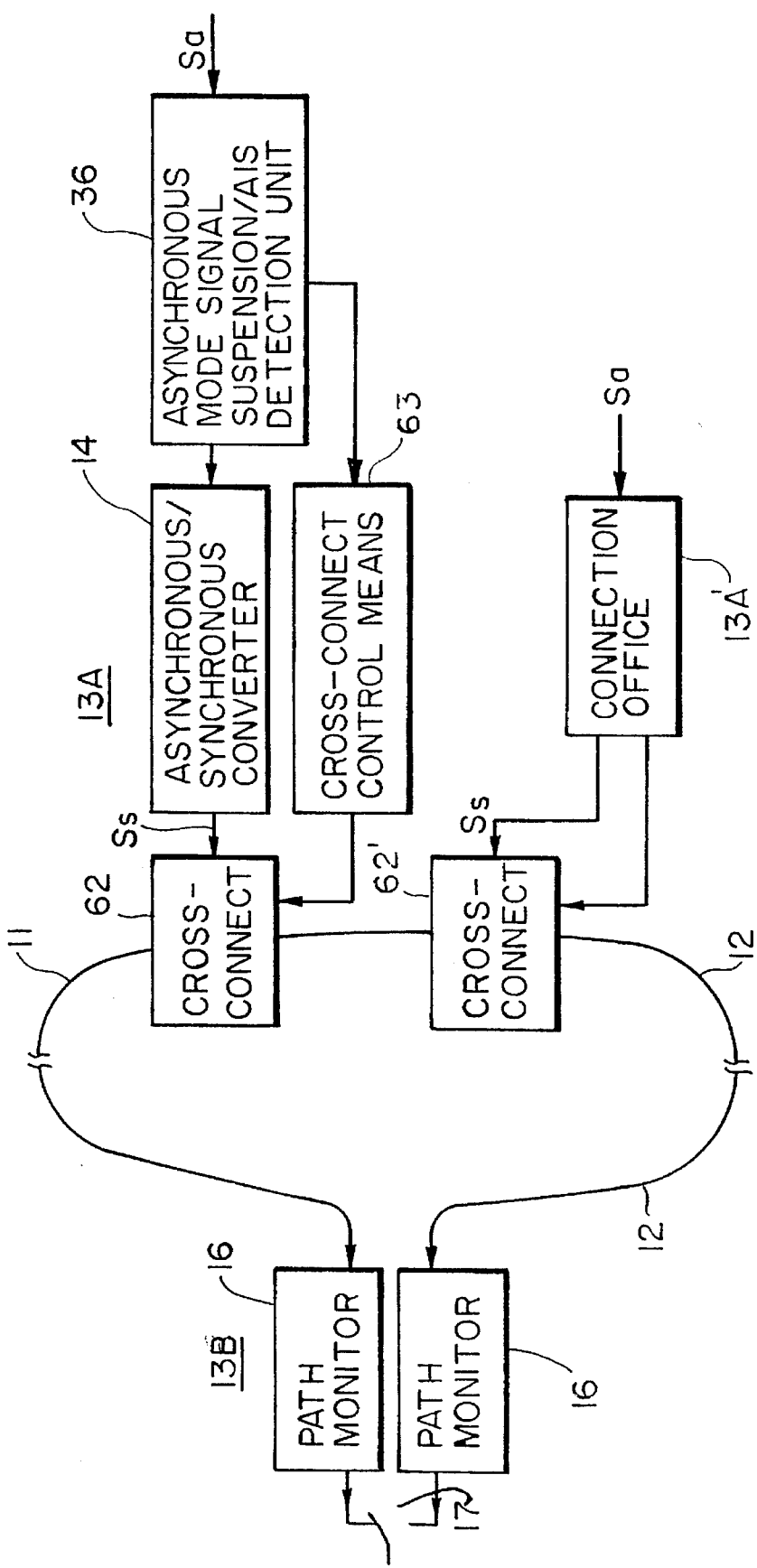
FIG. 7 is a view showing a fifth embodiment of the present invention.

FIG. 7 is a view showing a fifth embodiment of the present invention. The system to which this fifth embodiment is applied is a composite communication system comprised of a synchronous communication system 10 which has path termination offices 13B inserted in ring-like transmission lines 11 and 12 and includes a path switch 17 which switches synchronous mode path signal Ss input from one of the ring-like transmission lines (11 and 12) to the synchronous mode path signal input from the other line when detecting in a path termination office 13B a path AIS showing suspension of the asynchronous mode path signal Ss or a fault in that path signal and an asynchronous communication system 19 which transmits an asynchronous mode signal Sa and is combined with the synchronous communication system 10. Accordingly, except for cross-connect equipment 62, 62', the configuration is the same as that of the first to fourth embodiments explained above. Further, the connection offices 13A and 13A' are connected to the ring-like transmission lines (11 and 12) through the cross-connect equipment 62 and 62' respectively.

The cross-connect equipment 62, 62' are apparatuses performing the role of variably setting the directions of each channel. Once set, these remain fixed until the system configuration is changed. Accordingly, a function considerably close to the previously mentioned path switch 17 is performed at the connection office 13A and 13A' side. The fifth embodiment takes note of this point and is characterized by the provision of the illustrated cross-connect control means 63 (also at the office 13A'). The cross-connect control means 63 is provided with a cross-connect equipment 62 and is provided in the connection office 13A connecting the synchronous communication system 10 and the asynchronous/synchronous converter 19. When detecting an asynchronous system AIS showing a suspension in the asynchronous mode signal Sa or a fault in that signal (Sa), it changes the cross-connect setting of the cross-connect equipment 62 and 62'.

In the first to fourth embodiments, path switching was performed in the path termination office 13B on the basis of an indication from the connection offices 13A and 13A', but in the fifth embodiment, the connection offices 13A and 13A' perform the path switching themselves when detecting a fault in the asynchronous system. The situation at the other party is ignored in this switching, so it is possible that a desired protection route cannot be secured, but this configuration becomes extremely simple.

Figure 8:
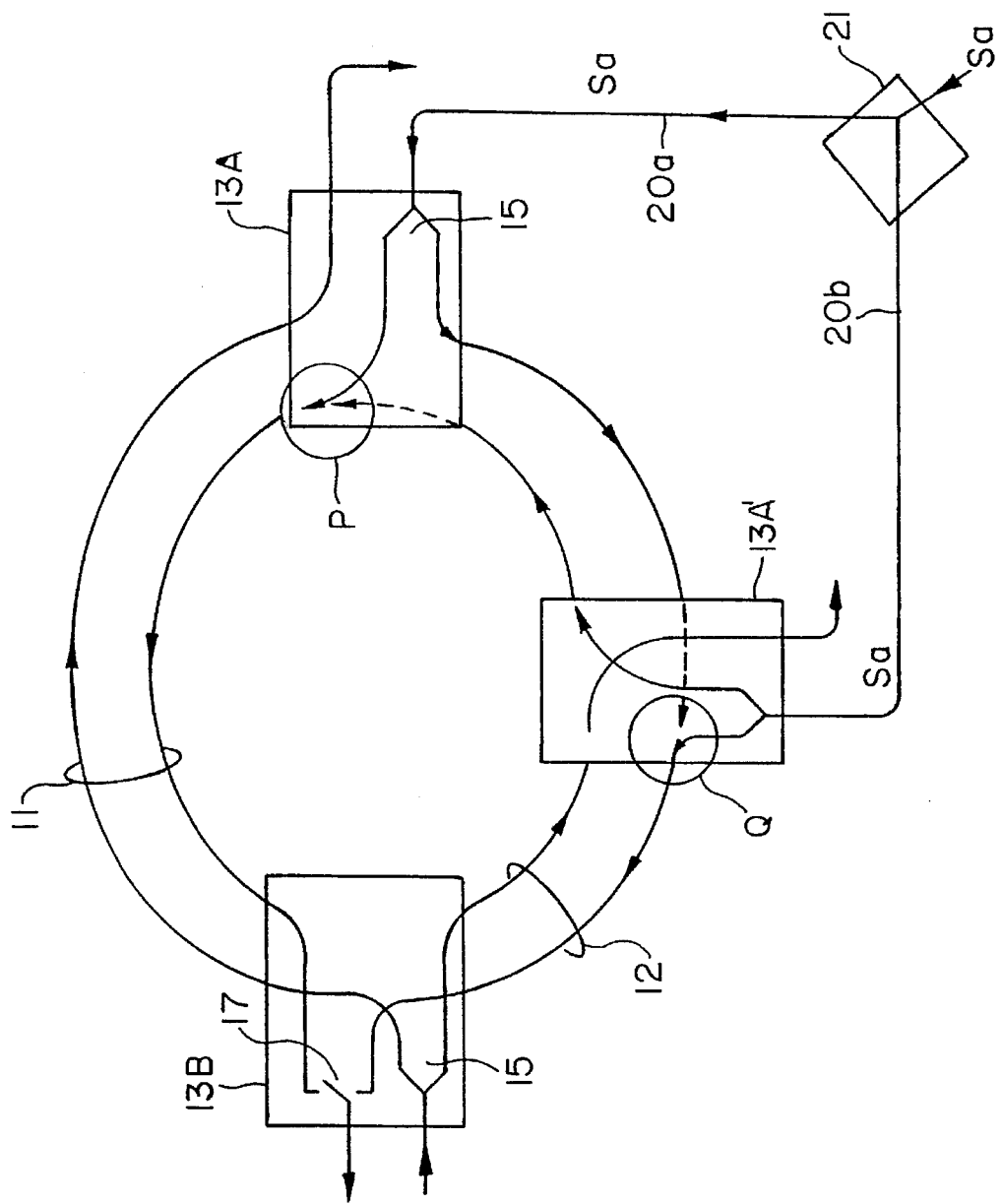
FIG. 8 is a view showing a duplex ring shown in FIG. 7 by a specific example.

FIG. 8 is a view showing an actual ring configuration as in FIG. 7, i.e., a duplex ring. In explaining the configuration of FIG. 7, it would be more easily understandable to show the actual duplex ring configuration as in this figure. However, just the flow of the loop is taken out and shown.

The identical input signal Sa from the previously mentioned redundancy line forming unit 21 is subjected to the "through", "drop", or "insert" operation of a transmission signal by the cross-connection function units shown by the circles P and Q in FIG. 8. If the cross-connect settings of these cross-connect function units is made as shown by the solid lines in the figure, then route diversity for the signal Sa can be ensured at the path termination office 13B.

Here, assuming that a disconnect occurs in the redundancy line 20b in the figure, the signal Sa from the redundancy line 20a passing through the office 13A passes through the office 13A' side to be given to the office 13B so as to save it from the disconnection fault. In this case, the cross-connect setting in the circle Q in the cross-connect equipment 62' is switched from the above-mentioned "insert" to "through" by the cross-connection setting means in the office 13A'.

Figure 9:
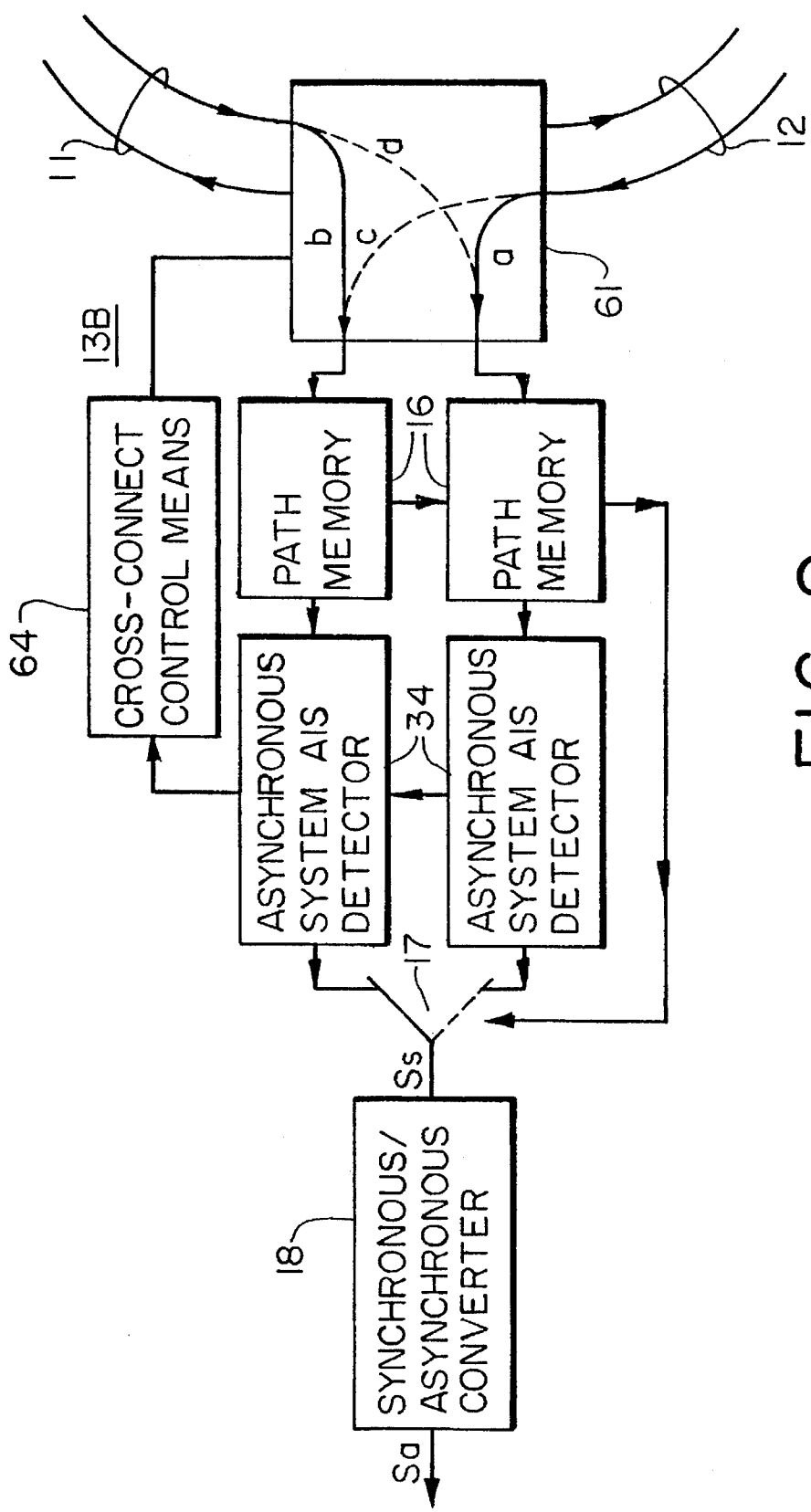
FIG. 9 is a view showing a sixth embodiment of the present invention.

FIG. 9 is a view showing a sixth embodiment of the present invention. The composite asynchronous/synchronous system to which this sixth embodiment is applied is substantially the same as the system of FIG. 7 showing the fifth embodiment.

In the fifth embodiment, the cross-connect equipment 62 and 62' were placed in the connection offices 13A and 13A', but in the sixth embodiment, a similar cross-connect equipment is placed in the path termination office 13B (reference numeral 61 of the figure).

That is, the cross-connect control means 64 of the sixth embodiment is provided in the path termination office 13B and changes the cross-connect setting of the cross-connect equipment 61 when an asynchronous system AIS showing a fault in the asynchronous mode signal Sa is detected in the asynchronous system AIS detection unit 34.

Figure 15:
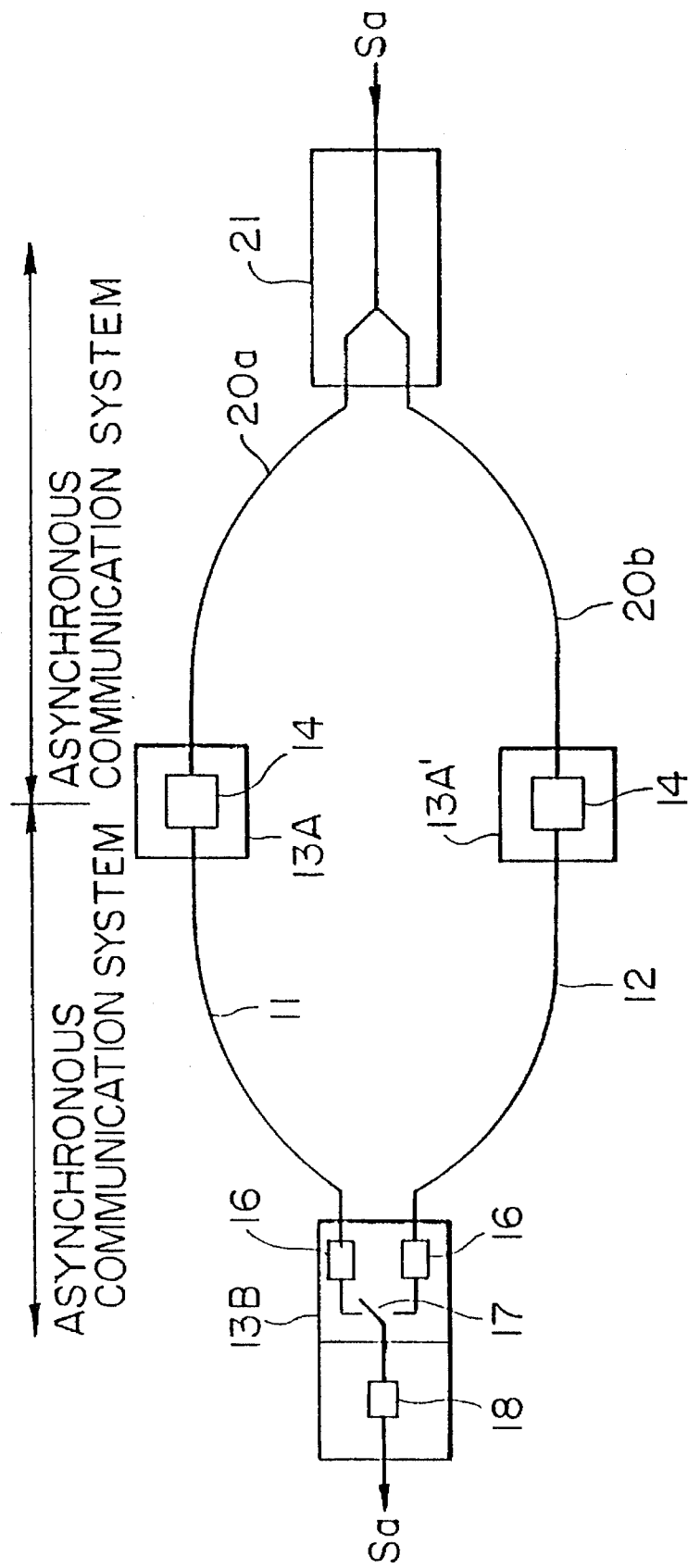
FIG. 15 is a view showing a composite synchronous and asynchronous system improved over the system of FIG. 14.

In FIG. 9, when the path switch 17 is in the illustrated connected state and an asynchronous system AIS is contained in the path signal input from the route "b" in the cross-connect equipment 61 up to then, the asynchronous system AIS is detected by the detection unit 34 to cause the cross-connect control mans 64 to operate. The means 64 changes the setting of the route in the cross-connect equipment 61 from the above-mentioned "b" to the route "c" so that an input signal identical to that received from the office 13A up to then is received from the other office 13A' (see FIG. 15).

Further, the side adopting the route "a" up to then changes the setting to the route "d".

Figure 10:
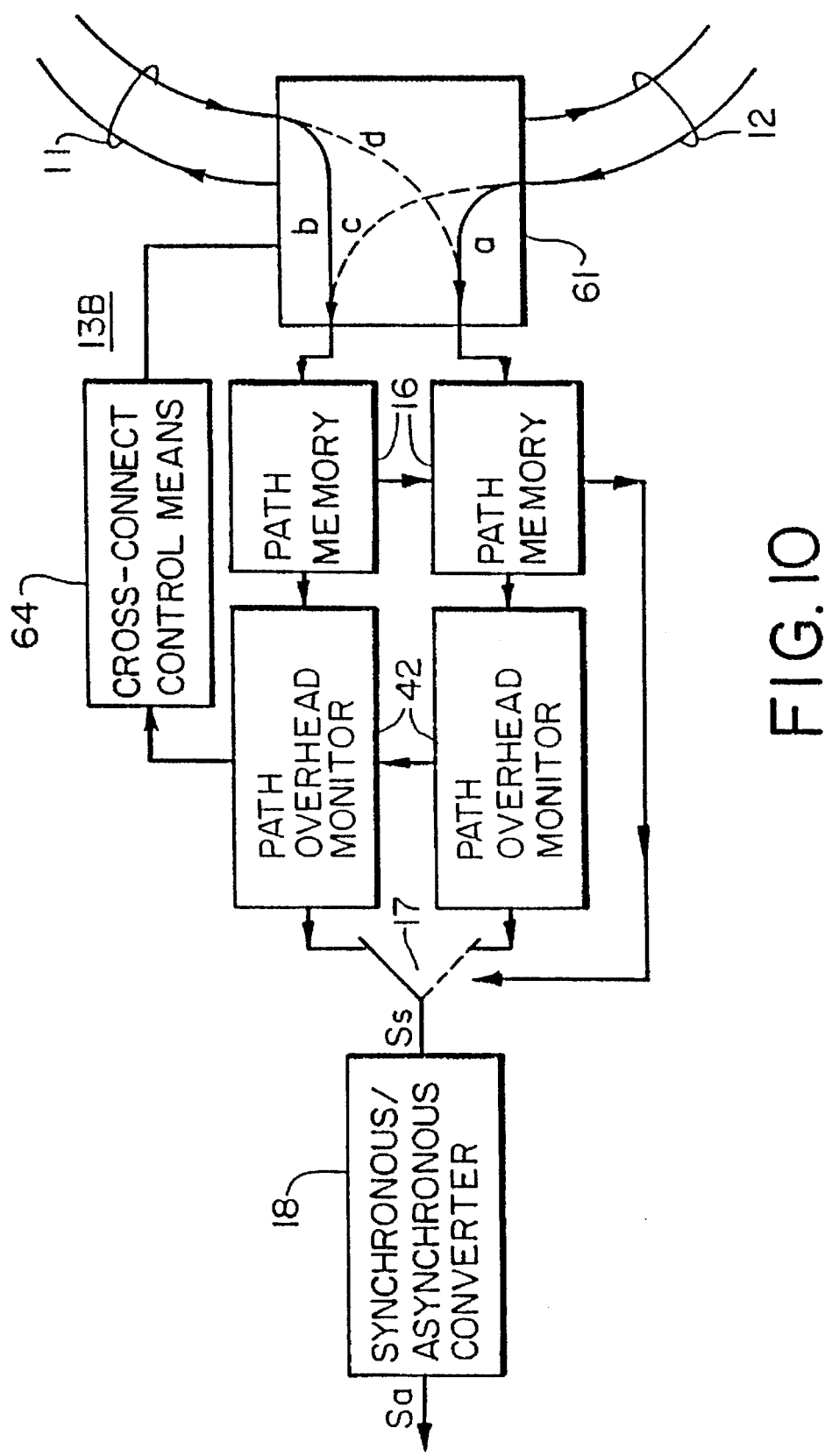
FIG. 10 is a view showing a seventh embodiment of the present invention.

FIG. 10 is a view showing a seventh embodiment of the present invention. The seventh embodiment realizes the above-mentioned sixth embodiment (FIG. 9) by using the previously mentioned third embodiment (FIG. 3). That is, in the connection office 13A or 13A', the asynchronous mode fault detection signal from the asynchronous signal suspension/AIS detector 36 is prepared by the overhead data creation unit 41 (asynchronous system fault notifying means 31) as path overhead data and is sent to the path termination office (13B in FIG. 10) placed on the path signal. In the path termination office 13B, the path overhead monitor 42 detects the fault detection signal in the path overhead, drives the cross-connect control means 64, and, as in the case of FIG. 9, changes the cross-connect setting at the cross-connect equipment 61.

Figure 11:
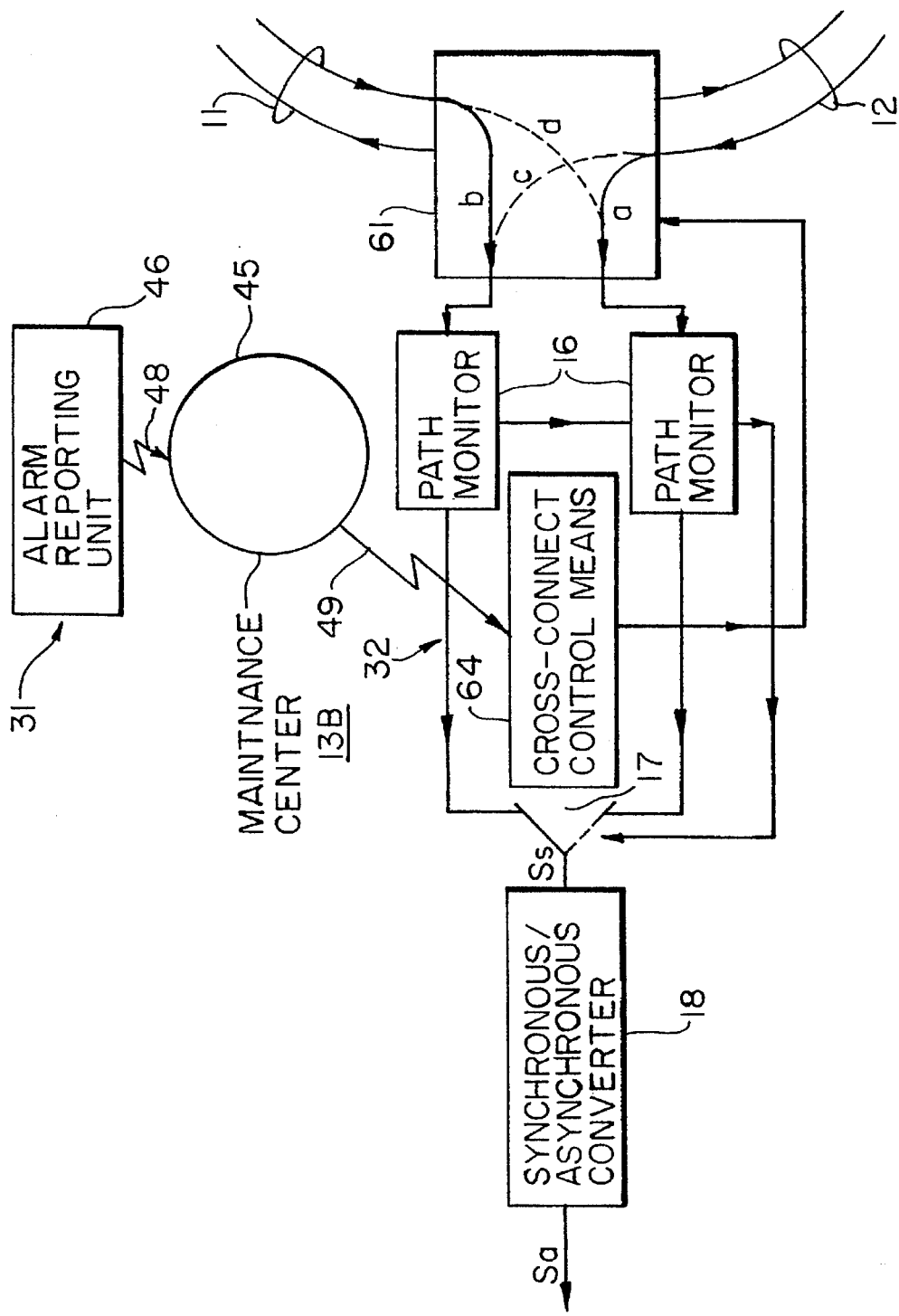
FIG. 11 is a view showing an eighth embodiment of the present invention.
Figure 13:
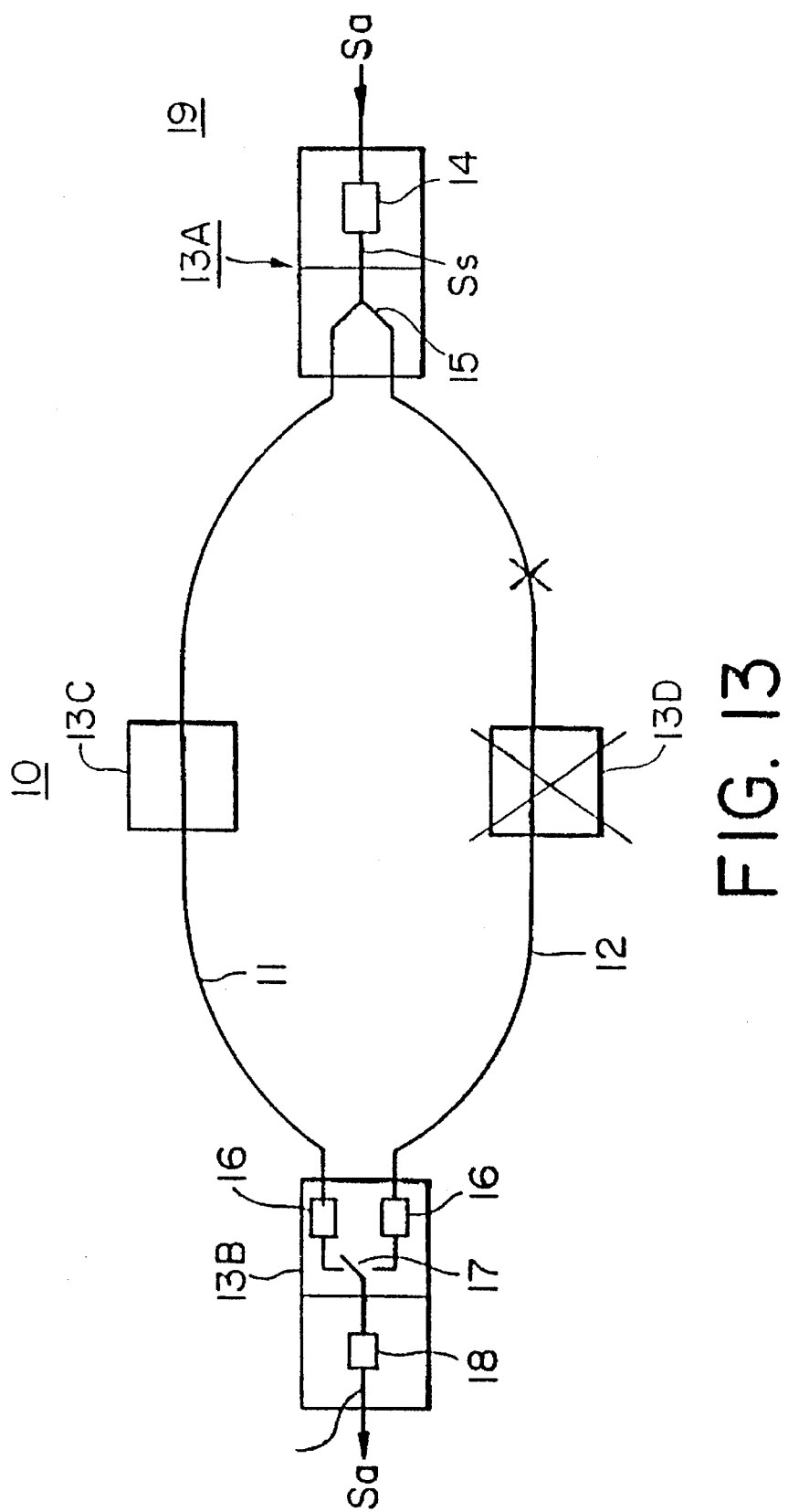
FIG. 13 is a view showing an example of the general configuration of a synchronous communication system.
Figure 14:
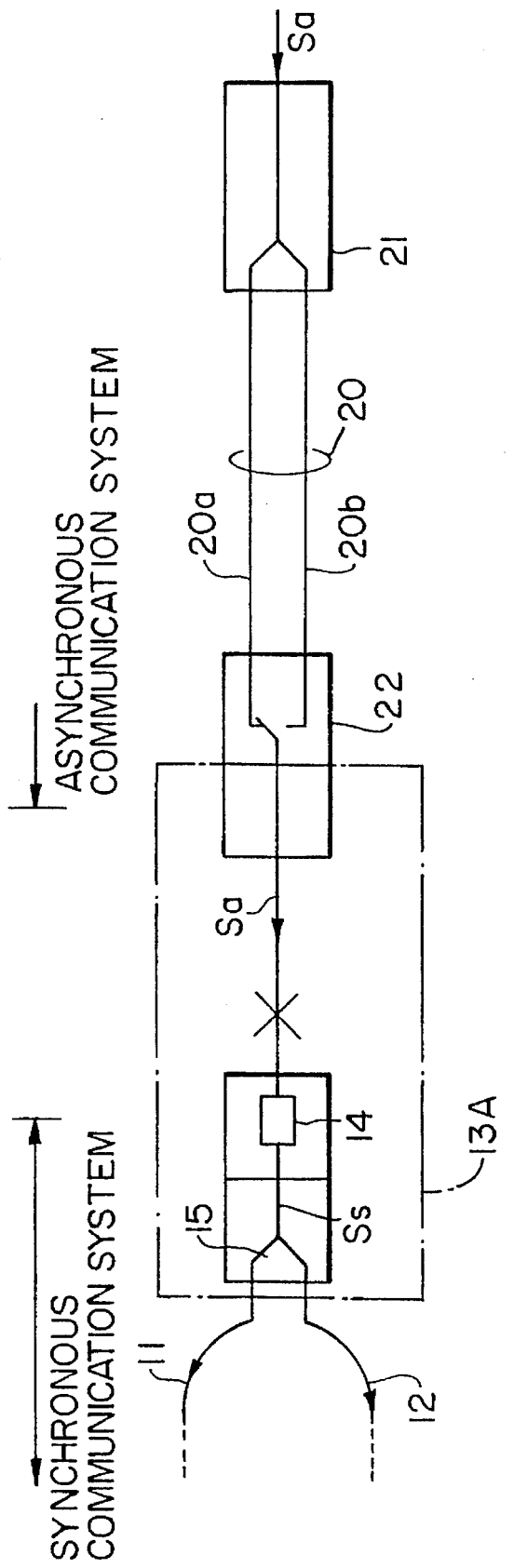
FIG. 14 is a view showing a conventional example of merging of a synchronous and asynchronous communication system.

FIG. 11 is a view showing an eighth embodiment of the present invention. This eighth embodiment is a modification of the seventh embodiment mentioned above (FIG. 10) and performs the notification and control in the detection of the asynchronous mode fault in the seventh embodiment in accordance with the previously mentioned fourth embodiment (FIG. 5).

That is, it is provided with an asynchronous system fault notifying means 31 which is provided in the connection office 13A connecting the synchronous communication system 10 and the asynchronous communication system 19 and sends to the path termination office 13B a fault detection signal when detecting an asynchronous system AIS showing a suspension of the asynchronous mode signal Sa or a fault in that signal. Here, the asynchronous system fault notifying means is comprised by an alarm reporting unit which transfers the fault detection signal to an existing maintenance center 45 which centrally monitors and controls the composite communication system as a whole.

Further, provision is made of a cross-connect control means 64 which is provided in the path termination office 13B and changes the cross-connect setting in the cross-connect equipment 61 based on a cross-connect setting change command signal transferred from the maintenance center 45.

FIG. 12 is a view showing a preferable means used in the eighth embodiment (FIG. 11). This configuration is substantially the same as the configuration of FIG. 6 explained previously. That is, the maintenance center 45 is provided with a map memory 68 which holds, in the form of a table, information included in the fault detection signal from the alarm reporting unit 46, as pairs of first information showing the originating office of the path of the fault and the channel number of the fault, and second information showing the path termination office and channel number relating to the originating office of the path of the fault and the channel number of the fault. The cross-connect setting change command signal is read out from that map memory 68.

The functions of the alarm processing and display unit 71, the decision unit 72, and the command issuing unit 73 in the figure are substantially the same as the functions of the alarm processing and display unit 51, the decision unit 52, and the command issuing unit 53 in FIG. 6.

As explained above, according to the present invention, even if a fault occurs in an asynchronous mode signal in a composite synchronous/asynchronous system comprised of a combination of a synchronous communication system and an asynchronous communication system, a protection route is ensured in the same way as when a fault occurs in a synchronous mode signal in a synchronous communication system. Therefore, a communication system with a higher reliability and higher quality can be realized.

What is claimed is:

1. A composite asynchronous/synchronous system having the function of switching paths at the time of a fault, comprising:

a synchronous communication system (10), which has a path termination office (13B) inserted into ring-like transmission lines (11 and 12), and includes path monitors respectively receiving signal from said transmission lines and a path switch (17) for changing a synchronous mode path signal input from one of the ring-like transmission lines to a synchronous mode path signal input from the other line when a path monitor in the path termination office (13B) detects a synchronous path Alarm Indication Signal (first AIS) from said transmission line of said synchronous system showing one of (a) a synchronous mode path signal has been suspended on said one transmission line and (b) there is a fault in the path signal on said one transmission line;

an asynchronous communication system (19), which transmits an asynchronous mode signal and is combined with the synchronous communication system, said composite asynchronous/synchronous system having at least asynchronous system fault notifying means (31), which are provided in each of two connection offices (13A and 13A') connecting the synchronous communication system to the asynchronous communication system by two routes and which, when an asynchronous system fault defection signal (second AIS) occurs in said asynchronous system showing that there is a fault in an asynchronous mode signal, convert the fault detection signal to information recognizable in the synchronous mode and sends the information to the path termination office, and an asynchronous system fault path switching means (32), provided in the path termination office, for receiving the fault detection signal, and detecting one of said fault detection signal from the asynchronous mode path signal and the fault detection signal sent from said asynchronous system fault notifying means, and switching the synchronous path signals transferred away from a fault on the ring-like transmission lines.

2. A composite asynchronous/synchronous system as in claim 1, wherein provision is made of only said asynchronous system fault notifying means among said asynchronous system fault notifying means (31) and said asynchronous system fault path switching means (32), said asynchronous system fault notifying means including a path AIS conversion unit (33) which when receiving said fault detection signal converts the same to the signal mode of the synchronous path AIS to form a synchronous path AIS and sends the formed synchronous path AIS to the path termination office (13B), and said path switch (17) can be switched at the path termination office even by the converted and sent synchronous path AIS.

3. A composite asynchronous/synchronous system as in claim 2, wherein said fault detection signal for activating said asynchronous system fault notifying means (31) is output by one of (a) an asynchronous mode signal suspension/AIS detector (36) which detects suspension of the asynchronous mode signal and (b) an asynchronous system AIS.

4. A composite asynchronous/synchronous system as in claim 2, wherein said path AIS conversion unit (33) is comprised of an AIS generator (35) which generates a path AIS when receiving said fault detection signal and an asynchronous/synchronous converter (14) which converts the asynchronous mode signal to a synchronous mode path signal for transferring the thus produced path AIS to the synchronous mode path signal.

5. A composite asynchronous/synchronous system as in claim 1, wherein provision is made of only said asynchronous system fault path switching means among said asynchronous system fault notifying means (31) and said asynchronous system fault path switching means including an asynchronous system AIS detection unit (34), which detects the fault detection signal mapped and sent in said synchronous mode path signal from one of the two connection offices (13A and 13A'), said asynchronous system AIS detection unit switching the path switch (17) in the same way as the path monitor (16) when detecting said fault detection signal.

6. A composite asynchronous/synchronous system as in claim 1, wherein both said asynchronous system fault notifying means (31) and said asynchronous system fault path switching means (32) are included as a pair, said asynchronous system fault notifying means (31) including an overhead data creation unit (41) which creates said fault detection signal as path overhead data, and said asynchronous/synchronous conversion unit 14 which converts said asynchronous mode signal to said synchronous mode path signal inserts the created path overhead data into the synchronous mode path signal for transmission.

7. A composite asynchronous/synchronous system as in claim 6, wherein said asynchronous system fault path switching means (32) in said path termination office (13B) includes a path overhead monitor (42) which reads said path overhead.

8. A composite asynchronous/synchronous system as in claim 1, wherein provision is made of both said asynchronous system fault notifying means (31) and said asynchronous system fault path switching means (32) as a pair, said asynchronous system fault notifying means (31) including an alarm reporting unit (46) for sending said fault detection signal to a maintenance center (45) which centrally monitors and controls the overall composite asynchronous/synchronous system, and said asynchronous system fault path switching means (32) including a path switch control unit (47), which performs the switching of the path switch (17) in response to a path changeover command transferred from the maintenance center.

9. A composite asynchronous/synchronous system as in claim 8, wherein the maintenance center (45) is provided with a map memory (48) which holds in the form of a table information included in the fault detection signal from the alarm reporting unit (46) as pairs of first information showing the originating office of the path of the fault and the channel number of the fault, and second information showing the path termination office and channel number relating to the originating office of the path of the fault and the channel number of the fault, and wherein the path changeover command is read out from that map memory.

10. A composite asynchronous/synchronous system having the function of switching paths at the time of a fault, comprising:

a synchronous communication system (10) which has a path termination office (13B) inserted into ring-like transmission lines (11 and 12) and includes a path switch (17) for changing a synchronous mode path signal input from one of the ring-like transmission lines to a synchronous mode path signal input from the other line when the path termination office (13B) detects a synchronous path AIS showing one of (a) the synchronous mode path signal has been suspended and (b) there is a fault in the path signal;

an asynchronous communication system (19) which transmits an asynchronous mode signal and is combined with the synchronous communication system, said composite asynchronous/synchronous system being provided with cross-connect means (63) which are provided in two connection offices (13A, 13A') connecting said synchronous communication system and said asynchronous communication system by two routes and each being provided with cross-connects (62, 62'), and which change the cross-connect settings at the cross-connect equipment (62, 62') when a fault detection signal is issued showing one of suspension of the asynchronous mode signal and a fault in the signal.

11. A composite asynchronous/synchronous system having the function of switching paths at the time of a fault, comprising:

a synchronous communication system (10) which has a path termination office (13B) inserted in ring-like transmission lines (11 and 12) through cross-connect equipment (61) and includes a path switch (17) for changing a synchronous mode path signal input from one of the ring-like transmission lines to a synchronous mode path signal input from the other line when the path termination office detects a path alarm indication signal AIS from said one ring-like transmission line showing one of (a) a synchronous mode path signal has been suspended and (b) there is a fault in the synchronous path signal in said one transmission line;

an asynchronous communication system (19), which transmits an asynchronous mode signal and is combined with the synchronous communication system, said composite asynchronous/synchronous system including cross-connect means (64) which is provided in said path termination office (13B) and changes the cross-connect settings at the cross-connect equipment (61) when detecting an AIS from said asynchronous system showing there is a fault in said asynchronous mode signal.

12. A composite asynchronous/synchronous system having the function of switching signal paths at the time of a fault, comprising:

a synchronous communication system (10) having a path termination office (13B) inserted in a pair of ring-like transmission lines (11 and 12) through cross-connect equipment (61) and including a path switch (17) for switching from a synchronous mode path signal input from one of the ring-like transmission lines to a synchronous mode path signal input from the other line when the path termination office detects that there is a fault included in the synchronous mode path signal in said one transmission line;

an asynchronous communication system (19), which transmits an asynchronous mode signal and is combined with the synchronous communication system, said composite asynchronous/synchronous system being provided with overhead data creation units (41) which are provided in the two connection offices (13A, 13A') connecting said synchronous communication system and said asynchronous communication system by two routes and which create a fault detection signal as path overhead data when a fault detection signal is issued from a fault detection unit (36) of said asynchronous system showing one of suspension of said asynchronous mode signal and a fault in the asynchronous signal, and being provided with a path overhead monitor (42) in said path termination office for detecting the fault detection signal in said path overhead sent in the said path signal, and cross-connect control means (64) in the path termination office for changing the cross-connect settings at the cross-connect equipment by the output of the path overhead monitor (42).

13. A composite asynchronous/synchronous system having the function of switching signal paths at the time of a fault, comprised of a synchronous communication system (10) having a path termination office (13B) inserted in a pair of ring-like transmission lines (11 and 12) through cross-connect equipment (61) and including a path switch (17) for switching from a synchronous mode path signal input from one of the ring-like transmission lines to a synchronous mode path signal input from the other transmission line when the path termination office detects a path alarm indication signal AIS showing one of (a) a suspension of the synchronous mode path signal on said one transmission line and (b) a fault in the synchronous path signal on said one transmission line;

an asynchronous communication system (19) which transmits an asynchronous mode signal and is combined with the synchronous communication system, said composite asynchronous/synchronous system including asynchronous system fault notifying means (31) which are provided in each of two connection offices (13A, 13A') connecting said synchronous communication system and said asynchronous communication system by two routes, said asynchronous system fault notifying means sending to said path termination office a fault detection signal when detecting an AIS from said asynchronous communication system showing one of (a) suspension of said asynchronous mode signal and (b) a fault in that asynchronous signal, each of said asynchronous system fault notifying means including an alarm reporting unit (46) which sends said fault detection signal to an existing maintenance center (45) which centrally monitors and controls the overall composite asynchronous/synchronous system, and cross-connect means (64) which is provided in said path termination office and which changes the cross-connect settings at the cross-connect equipment (61) in response to a cross-connect setting change command transferred from the maintenance center.

14. A composite asynchronous/synchronous system as in claim 12, wherein the maintenance center (45) is provided with a map memory (68) which holds in the form of a table information included in the fault detection signal from the alarm reporting unit (46), as pairs of first information showing the originating office of the path of the fault and the channel number of the fault, and second information showing the path termination office and channel number relating to the originating office of the path of the fault and the channel number of the fault, the cross-connect setting change command signal being read out from said map memory.

* * * * *